United States Patent
Sentosa et al.

(10) Patent No.: US 10,777,054 B2
(45) Date of Patent: Sep. 15, 2020

(54) SECURITY CAMERA SYSTEM

(71) Applicant: Superior Communications, Inc., Irwindale, CA (US)

(72) Inventors: Samuel Sentosa, Rancho Cucamonga, CA (US); George Chen, Chatsworth, CA (US); David P. Su, Montebello, CA (US)

(73) Assignee: SUPERIOR COMMUNICATIONS, INC., Irwindale, CA (US)

( * ) Notice: Subject to any disclaimer, the term of this patent is extended or adjusted under 35 U.S.C. 154(b) by 130 days.

(21) Appl. No.: 15/476,815

(22) Filed: Mar. 31, 2017

(65) Prior Publication Data
US 2017/0294090 A1   Oct. 12, 2017

Related U.S. Application Data

(60) Provisional application No. 62/321,128, filed on Apr. 11, 2016.

(51) Int. Cl.
*G08B 13/196*   (2006.01)
*H04N 7/18*   (2006.01)

(52) U.S. Cl.
CPC . *G08B 13/19619* (2013.01); *G08B 13/19645* (2013.01); *H04N 7/181* (2013.01); *G08B 13/19602* (2013.01); *G08B 13/19626* (2013.01); *G08B 13/19632* (2013.01); *G08B 13/19656* (2013.01); *G08B 13/19695* (2013.01)

(58) Field of Classification Search
CPC ........ G08B 13/19684; G08B 13/19619; G08B 13/19636; G08B 13/19656
See application file for complete search history.

(56) References Cited

U.S. PATENT DOCUMENTS

| | | | | |
|---|---|---|---|---|
| 9,460,596 B1* | 10/2016 | Moses | ...................... | H04N 7/14 |
| 9,589,446 B1* | 3/2017 | Dey | ....................... | G08B 13/08 |
| 2004/0028391 A1* | 2/2004 | Black | ............... | G08B 13/19656 386/223 |
| 2005/0189411 A1* | 9/2005 | Ostrowski | ............... | A47F 9/045 235/383 |
| 2007/0132849 A1* | 6/2007 | Hill | .................. | G08B 13/19636 348/159 |
| 2010/0313249 A1* | 12/2010 | Castleman | .............. | H04L 67/10 726/5 |
| 2015/0077567 A1* | 3/2015 | Scalisi | ................ | H04M 1/0291 348/152 |
| 2015/0324616 A1* | 11/2015 | Alarabi | ................. | H04W 12/12 726/25 |

* cited by examiner

*Primary Examiner* — Joshua D Taylor
(74) *Attorney, Agent, or Firm* — Snell & Wilmer LLP

(57) ABSTRACT

A monitoring system includes a first camera having a housing and an image sensor positioned in or on the housing and designed to detect image data corresponding to an environment of the first camera. The camera further includes a camera network access device positioned in the housing and designed to wirelessly transmit the image data. The camera further includes a local power source positioned in the housing, coupled to the image sensor and the camera network access device, and designed to store electrical power to be used by the image sensor and the camera network access device. The system also includes a hub having at least one hub network access device designed to wirelessly receive the image data from the camera network access device and to wirelessly transmit the image data to a cloud server.

19 Claims, 14 Drawing Sheets

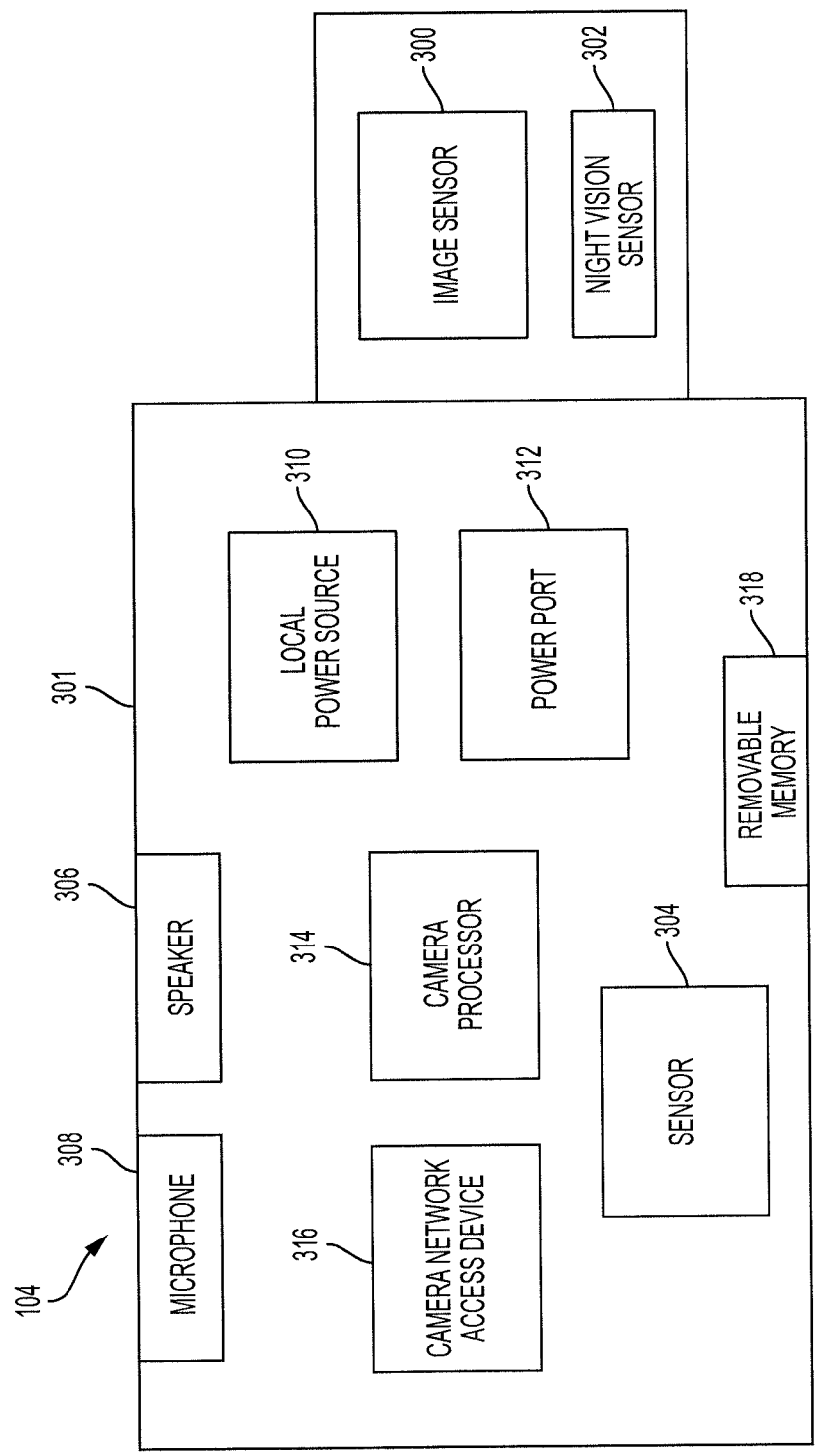

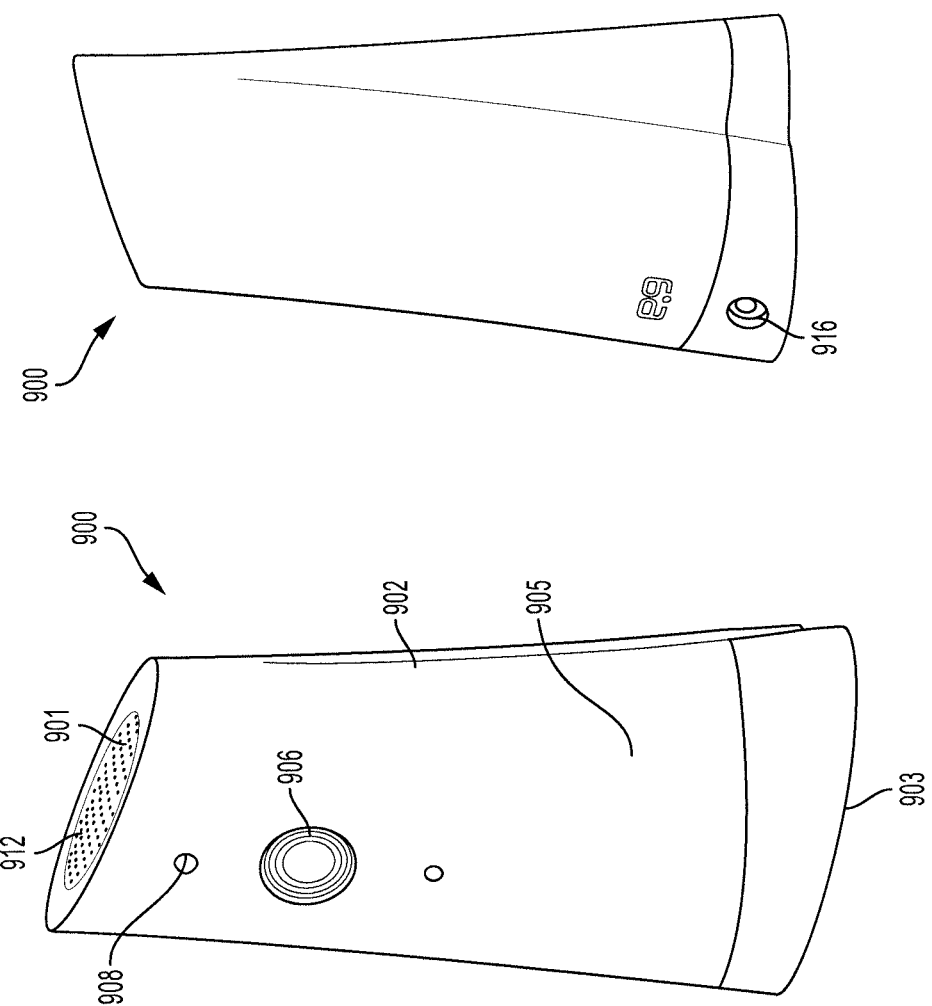

SECURITY CAMERA SYSTEM

CROSS-REFERENCE TO RELATED APPLICATIONS

This application claims the benefit and priority of U.S. Provisional Application No. 62/321,128, entitled "Security Camera," filed on Apr. 11, 2016, the entire disclosure of which is hereby incorporated by reference herein in its entirety.

BACKGROUND

Field

The present invention relates to a security monitoring system that includes multiple cameras connected to a hub that transmits the image data to a mobile device via the cloud.

Description of Related Art

Security systems have been in use for some time. Such systems may aid in safeguarding the lives of people and their property. Original security systems included an alarm and a sensor such as a motion sensor or a sensor capable of detecting when a door or window has opened. In response to the signal detecting an event, the alarm of the security system would sound. The hope was that the alarm would scare off any intruder or at least alert neighbors so that they could call authorities. Technology has advanced since the early days of security systems. The quantity and quality of sensors available for detecting potential intrusions has improved and modern security systems may be capable of transmitting and receiving data from devices associated with authorities and devices associated with users.

SUMMARY

Described herein is a monitoring system. The system includes a first camera having a housing and an image sensor positioned in or on the housing and designed to detect image data corresponding to an environment of the first camera. The camera further includes a camera network access device positioned in the housing and designed to wirelessly transmit the image data. The camera further includes a local power source positioned in the housing, coupled to the image sensor and the camera network access device, and designed to store electrical power to be used by the image sensor and the camera network access device. The system also includes a hub having at least one hub network access device designed to wirelessly receive the image data from the camera network access device and to wirelessly transmit the image data to a cloud server.

Also described is a monitoring system. The system includes a first camera having a housing and an image sensor positioned in or on the housing and designed to detect image data corresponding to an environment of the first camera. The camera further includes a camera network access device positioned in the housing and designed to wirelessly transmit the image data. The system further includes a hub having a first hub network access device designed to wirelessly receive the image data from the camera network access device and to wirelessly transmit the image data to a cloud server. The hub further includes a second hub network access device configured to wirelessly transmit the image data to the cloud server via a cellular protocol when the first hub network access device is unable to communicate with the cloud server.

Also described is a monitoring system. The system includes a first camera having a housing and an image sensor positioned in or on the housing and designed to detect image data corresponding to an environment of the first camera. The camera also includes a camera network access device positioned in the housing and designed to wirelessly transmit the image data. The system further includes a hub having at least one hub network access device designed to wirelessly receive the image data from the camera network access device and to wirelessly transmit the image data. The system further includes a cloud server having a cloud network access device designed to receive the image data from the hub and to transmit the image data to a remote device associated with a user.

BRIEF DESCRIPTION OF THE DRAWINGS

The features and advantages of the present application will become more apparent from the detailed description set forth below when taken in conjunction with the drawings, wherein:

FIG. 3 is a block diagram illustrating various features of a camera of the monitoring system of FIG. 1 according to an embodiment of the present disclosure;

FIGS. 9A and 9B are drawings illustrating an exemplary design of a central hub for use with a monitoring system according to an embodiment of the present disclosure;

DETAILED DESCRIPTION

A monitoring system according to the present disclosure may be used, for example, for security monitoring of an indoor or outdoor location. For example, the monitoring system may be installed in a factory to monitor the production of goods, may be installed in a home to monitor the security of the home, or the like. The monitoring system may include multiple cameras electronically connected to a central hub. The central hub may receive image data from the cameras, analyze the image data, and transmit the image data to a cloud server. The cloud server may store some or all of the image data, may further analyze the image data, and may transmit the image data or an analysis of the image data to a device associated with a user.

The monitoring system may provide several advantages and benefits over conventional monitoring systems. For example, the hub and the cameras may each include a port for receiving external electrical power along with a rechargeable battery for storing backup electrical power in case of a power outage. Because the central hub collects the image data from each camera and analyzes and transmits the image data rather than transmission and analysis occurring at each camera, a total cost of the system may be reduced. Furthermore, the central hub is capable of communicating with the cloud server or the mobile device associated with the user via a cellular connection in addition to a Wi-Fi (any of the 802.11 protocols established by the IEEE) or Ethernet connection. This provides the benefit of allowing communication with the monitoring system when a wired Internet connection or power is unavailable at the location of the monitoring system.

Figure 1:
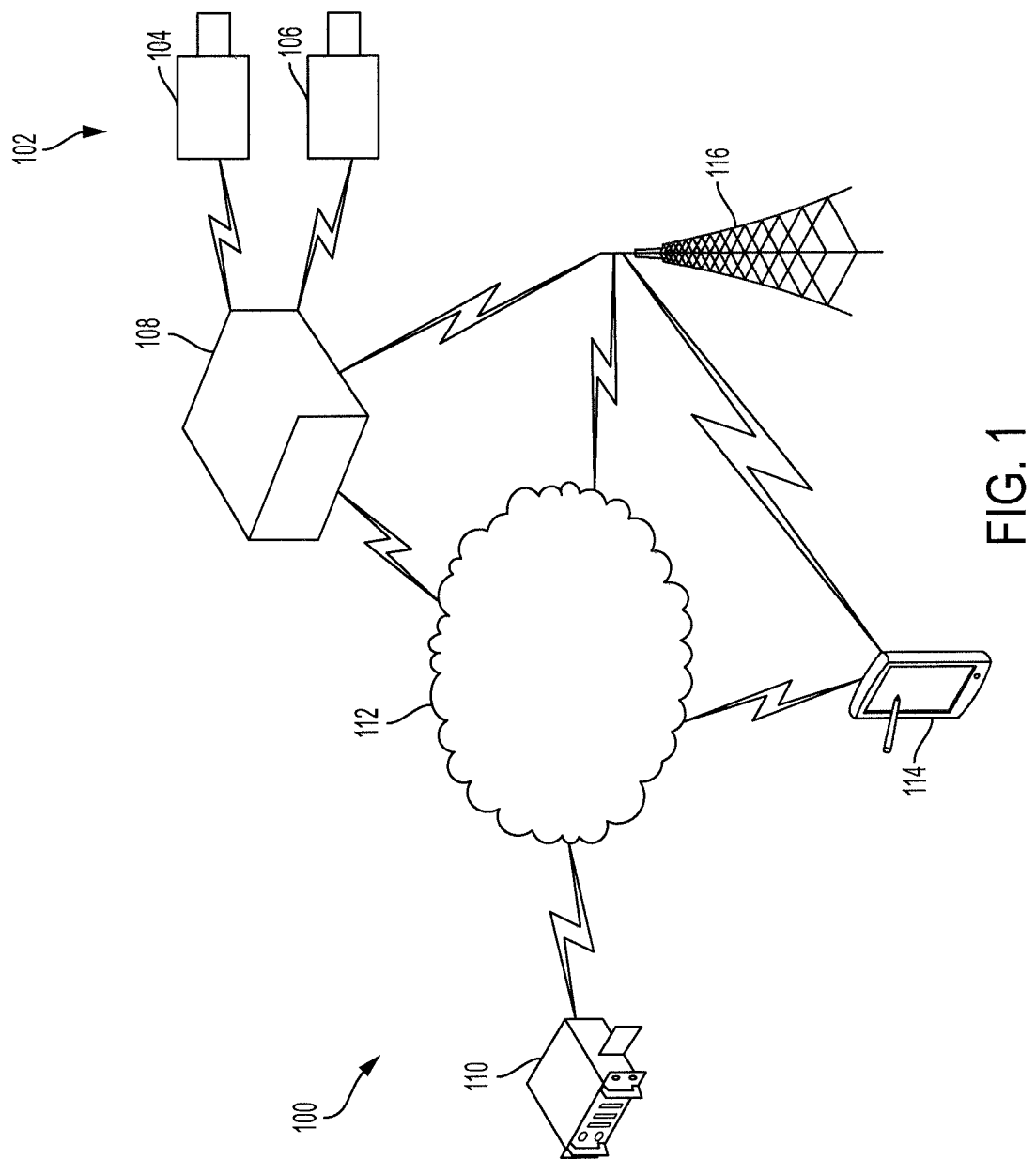
FIG. 1 is a drawing illustrating various features of a monitoring system according to an embodiment of the present disclosure.

Turning now to FIG. 1, an exemplary monitoring system 100 is shown. The monitoring system 100 includes a plurality of cameras 102 including a first camera 104 and a second camera 106. Each of the cameras 102 may be capable of detecting image data.

The system 100 further includes a central hub 108. The central hub 108 may be electrically connected to each of the cameras 102 and may receive the image data from each of the cameras 102. The central hub 108 may transmit the image data that it receives from each of the cameras 102. In some embodiments, the central hub 108 may also analyze the image data received from each of the cameras 102 and transmit the analysis of the image data.

The central hub 108 may be electrically coupled to a cloud server 110 via a cloud 112. In some embodiments, the central hub 108 may be connected to the cloud 112 via a Wi-Fi or Ethernet connection. For example, the hub 108 may be connected to a cable modem or a fiber connection via an Ethernet or Wi-Fi connection at an installation location of the central hub 108. Advantageously, the hub 108 may further include a cellular capability such that it may communicate directly with a cellular tower 116. In that regard, if the cable modem or fiber connection is unavailable, the hub 108 may continue communicating with the cloud server 110 via the cellular tower 116.

The cloud server 110 may receive the image data from the central hub 108. In some embodiments, the cloud server 110 may receive the analysis of the image data from the central hub 108. In some embodiments, the cloud server 110 may also or instead analyze the image data received from the central hub 108. The cloud server 110 may include a memory or database. The cloud server 110 may also store the image data in the memory or database.

The cloud server 110 may be connected to a mobile device 114 associated with a user. In some embodiments, the cloud server 110 may transmit the image data and/or the analysis of the image data to the mobile device 114. For example, a user may request to receive a feed of the image data from one of the cameras 102 via the mobile device 114. The cloud server 110 may receive the request and transmit the corresponding image data to the mobile device 114.

As another example, the central hub 108 or the cloud server 110 may analyze the image data to determine if the image data satisfies a predetermined condition. The predetermined condition may correspond to detection of movement, detection of an object having a shape similar to a person, or the like. In response to determining that the image data satisfies the predetermined condition, the central hub 108 or the cloud server 110 may issue a notification to be received by the mobile device 114 and/or may transmit the image data to the mobile device 114. Upon receipt of the notification, the mobile device 114 may request to issue an alarm (i.e., cause a speaker of the central hub 108 and/or one or more camera 102 to generate a noise, may initiate contact with emergency services, or the like). In some embodiments, the mobile device 114 may also or instead request to receive the image data.

In some embodiments, the mobile device 114 may directly receive the image data from the central hub 108 via the cellular tower 116. For example, upon request for the mobile device 114 to receive the image data, the central hub 108 may directly transmit the image data to the mobile device 114. As another example, if the central hub 108 is unable to directly connect to the cloud 112, the central hub 108 may directly transmit the image data to the mobile device 114.

Figure 2:
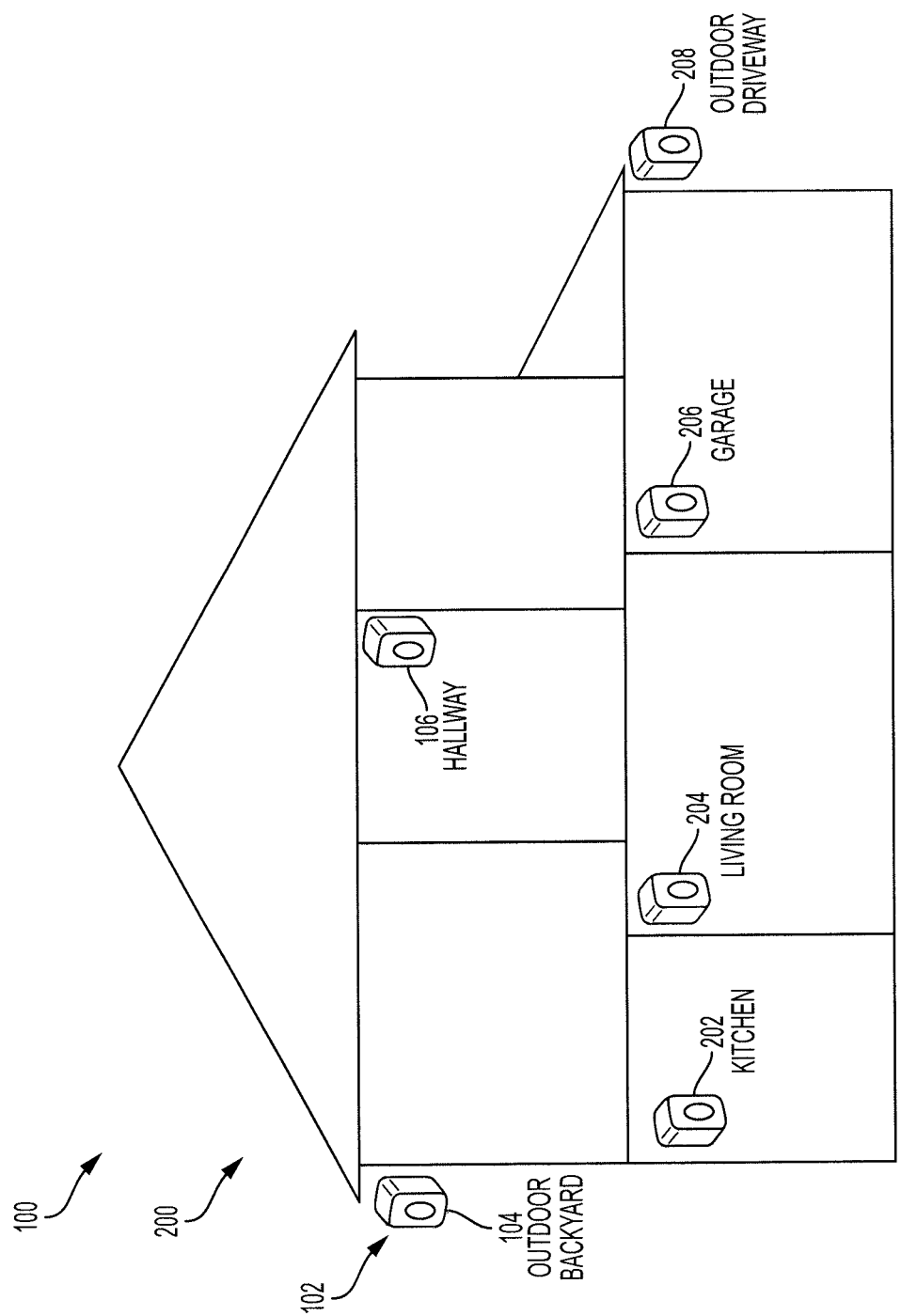
FIG. 2 is a drawing illustrating an exemplary placement of cameras of the monitoring system of FIG. 1 according to an embodiment of the present disclosure.

Referring now to FIG. 2, the system 100 may include any quantity of cameras 102. The quantity of cameras may be selected based on an area to be monitored. Because the central hub 108 may be connected to any quantity of cameras 102, the system 100 may be considered modular. In that regard, a user may continue to add new cameras 102 to the system 100 at any point in time.

As shown in FIG. 2, multiple cameras 102 may be positioned throughout a user's house 200. In particular, the camera 104 may be oriented towards a backyard of the house 200. The camera 106 may be positioned in an upstairs hallway of the house 200. Additional cameras 202, 204, 206, 208 may be positioned in a kitchen, living room, garage, and an outdoor driveway, respectively, of the house 200.

Turning now to FIG. 3, various features of the camera 104 are shown. The camera 104 includes a housing 301. Additional components of the camera 104 may be positioned inside of, or on a surface of, the housing 301.

The camera 104 further includes an image sensor 300. The image sensor 300 may be capable of detecting image data corresponding to an environment of the camera 104. The image sensor 300 may be capable of detecting image data corresponding to light in the visible spectrum (i.e., between about 390 nanometers (nm, 0.0154 thousandths of an inch (mils)) and about 700 nm (0.0276 mils)). Where used herein, about refers to the stated value plus or minus 5 percent of the stated value.

In some embodiments, the image sensor 300 may be capable of detecting image data within a relatively wide field of view. For example, the image sensor 300 may be capable of detecting image data having a 210 degree view, a 180 degree view, a 150 degree view, a 120 degree view, a 90 degree view, or the like. In some embodiments, the image sensor 300 may be capable of detecting images in high definition.

The camera 104 may further include a night vision sensor 302. The night vision sensor 302 may be capable of detecting image or light data corresponding to light outside of the visible range. For example, the night vision sensor 302 may be capable of detecting image or light data having a wavelength that is less than 390 nm (0.0154 mils, such as ultraviolet light) and/or greater than 700 nm (0.0276 mils, such as infrared light).

The night vision sensor 302 may detect movement or objects in the environment of the camera 104 at times when the image sensor 300 may be incapable of detecting such movement or object. In that regard, the camera 104 may be capable of detecting movement or objects regardless of an amount of light present in the environment. In some embodiments, the night vision sensor 302 may be designed to detect motion and may thus function as a trigger. For example, the night vision sensor 302 may be capable of detecting infrared light. In that regard, in response to detection of movement by the night vision sensor 302, the camera 104 may begin recording or transmitting data detected by the image sensor 300.

The camera 104 may further include one or more additional sensor 304. The one or more additional sensor 304 may include a light sensor configured to detect a change at least one of an amplitude or a frequency of the ambient light. The sensor 304 may also or instead include a motion sensor configured to detect movement within the environment of the camera 104. The sensor 304 may also or instead include a G-Force sensor (such as a gyroscope, an inertial measurement unit (IMU), or the like) capable of detecting movement of the housing 301 of the camera 104. The sensor 304 may also or instead include a touch sensor (such as a capacitive touch sensor) capable of detecting contact with an object. In some embodiments, the sensor 304 may include one or more additional or alternative sensors.

The data detected by the sensors may be used to determine if a predetermined condition corresponding to a potential danger has been met. For example, movement of the camera 104 (i.e., detected by a G-force sensor or by a capacitive touch sensor) may indicate that an individual is attempting to manipulate the camera 104. With brief reference to FIGS. 1 and 3, the central hub 108 may receive data from the camera 104 indicating that the camera 104 has been touched or moved. In response, the central hub 108 may transmit a message and/or image data from the camera 104 to the mobile device 114 indicating that the camera 104 has been touched or moved.

The camera 104 may further include a speaker 306 and a microphone 308. The microphone 308 may detect audio data in the environment of the camera 104 and the speaker 306 may output audio data received from the central hub 108. The audio data detected by the microphone 308 may be received and analyzed by the central hub 108.

In some embodiments, such as upon request from the device 114, the audio data detected by the microphone 308 may be transmitted to the mobile device 114 to be output. For example, if the camera detects a trigger (i.e., a predetermined condition has been met, such as detection of movement) then the central hub 108 may further transmit the audio data to the mobile device 114. In some embodiments, the central hub 108 may also analyze the audio data to determine if a predetermined condition has been. For example, if a noise is detected while the user is away from the location, the central hub 108 may determine that a predetermined condition has been met and, thus, transmit a message and/or image or audio data to the mobile device 114.

In some embodiments, a user may transmit audio data from the mobile device 114 to be output by the camera 104. For example, if a predetermined condition has been met, a user may be able to provide speech data (such as "get out of my house") to be output by the camera 104. In some embodiments, the hub 108 may be designed to control the speaker 306 to output an alarm in response to a predetermined condition being met.

Returning reference to FIG. 3, the camera 104 may further include a local power source 310 and a power port 312. The power port 312 may be capable of receiving electrical power from an external source such as a wall outlet. The power port 312 may transfer the electrical power to each electronic component of the camera 104. The local power source 310 may include a battery, such as a rechargeable battery. The local power source 310 may receive electrical power from the power port 312 to charge the rechargeable battery. The local power source 310 may further transfer electrical power to each electronic component of the camera 104. In that regard, the local power source 310 may continue to power components of the camera 104 when the external source of power becomes unavailable.

The camera 104 may further include a camera processor 314. The camera processor 314 may receive the image data from the image sensor 300 and may process the image data, for example, to filter the image data. The processor 314 may also edit or package the image data for transmission to the central 108. For example, the camera processor 314 may compress the image data such that its transmission utilizes relatively little bandwidth.

The camera 104 may further include a camera network access device. The camera network access device may include a port, connector, device, or the like capable of transmitting data to the central hub 108. For example, the camera network access device may be capable of transmitting data via Wi-Fi, Ethernet, Bluetooth®, a cellular protocol, or the like. In some embodiments, the camera 104 may include two or more camera network access devices. For example, the camera 104 may include a first network access device capable of transmitting data via Wi-Fi and a second network access device capable of transmitting data via a cellular protocol or Bluetooth® in case the Wi-Fi connection is unavailable.

The camera 104 may further include a removable memory port 318. The removable memory port 318 may include a port or other connector capable of interfacing with a removable device having electronic storage thereon. For example, the removable memory port 318 may include a port or connector capable of receiving an SD card, a USB stick, or the like. The camera processor 314 may cause some or all of the image data to be stored in the removable memory port 318. In some embodiments, the camera processor 314 may cause some or all of the image data to be stored in the removable memory port 318 in response to a predetermined condition being met. For example, the camera processor 314 may cause samples of the image data to be stored in the removable memory port 318 for a predetermined amount of time after a trigger event such as movement of the camera 104 or detection of an object in the environment.

Figure 4B:
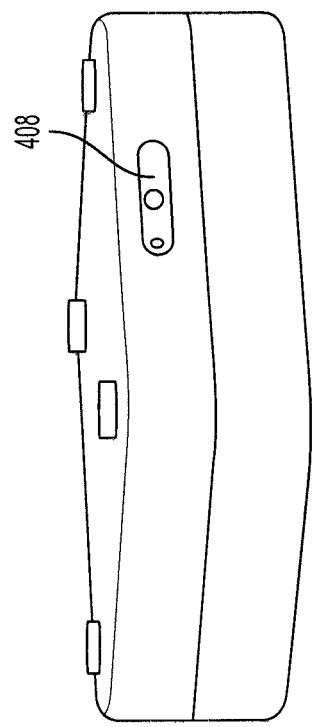
FIGS. 4A and 4B are drawings illustrating an exemplary design of a camera for use with a monitoring system according to an embodiment of the present disclosure.
Figure 4A:
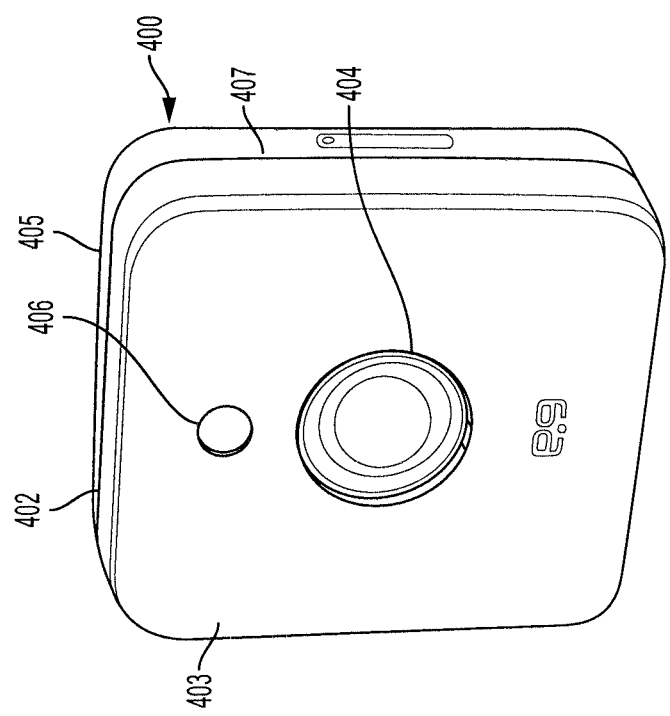

Turning to FIGS. 4A and 4B, an exemplary camera 400 is shown. The camera 400 includes a housing 402 having a shape that resembles a rectangular prism. The housing 402 has a front surface 403, a back surface 405, and four side surfaces 407. The front surface 403 and the back surface 405 have a larger surface area than do the four side surfaces 407.

The camera 400 includes an image sensor 404 and a motion sensor 406 located on the front surface 403 of the housing 402. The camera 400 further includes a removable memory port 408 on one of the sides 407 for receiving a removable memory device, such as an SD card or a USB stick. The housing 402 may include a feature (not shown) on the back surface 405 for mounting the camera 400. For example, the feature may include threading for a screw, a mount extending away from the back surface 405, a slot for receiving an external feature (such as a mortise for receiving a tenon) or the like.

Figure 5A:
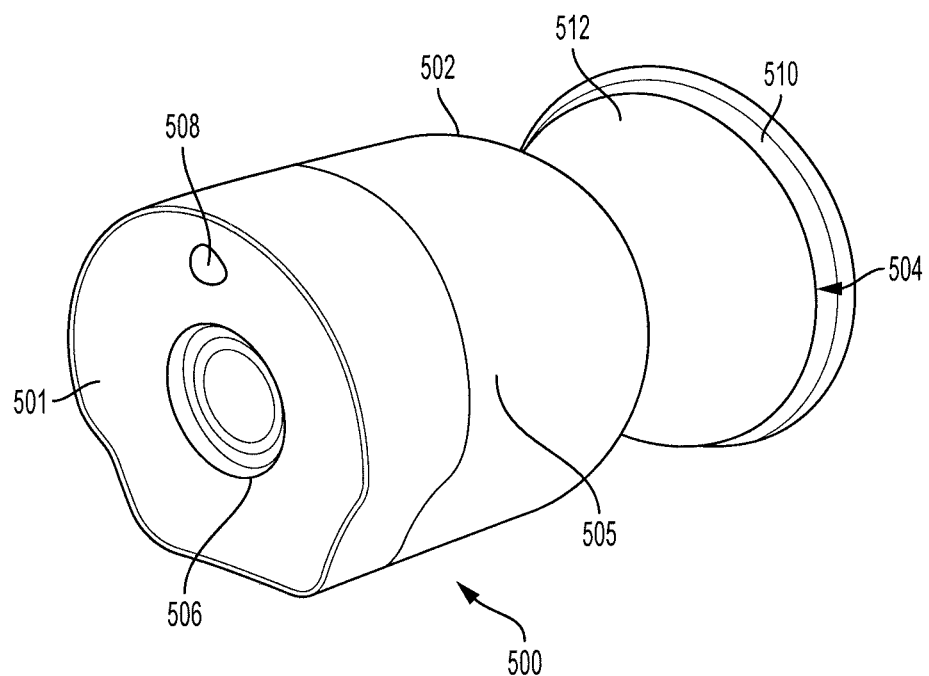
FIGS. 5A and 5B are drawings illustrating an exemplary design of a camera for use with a monitoring system according to an embodiment of the present disclosure.
Figure 5B:
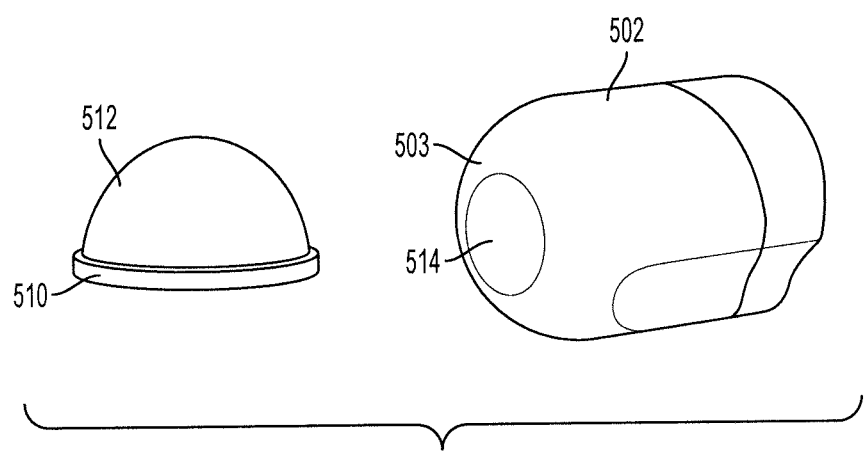

Referring now to FIGS. 5A and 5B, another exemplary camera 500 is shown. The camera 500 includes a housing 502 and a mount 504. The housing 502 has a front surface 501, a back surface 503, and a generally cylindrical outer surface 505. The camera 500 includes an image sensor 506 and a night vision sensor 508 both located on the front surface 501.

The mount 504 includes a mounting portion 510 for being coupled to a wall or other structure and a magnetic fitting 512. The housing 502 includes a magnetic socket 514 located on the back surface 503. After the mounting portion 510 has been coupled to a structure, the magnetic socket 514 may be positioned near the magnetic fitting 512. At this point, the magnetic attraction between the socket 514 and the fitting 512 may cause the housing 502 to remain in place relative to the mount 504. Because the magnetic socket 514 and the magnetic fitting 512 have a generally rounded shape, the orientation of the housing 502 relative to the mount 504 may be adjusted by a user.

Figure 6A:
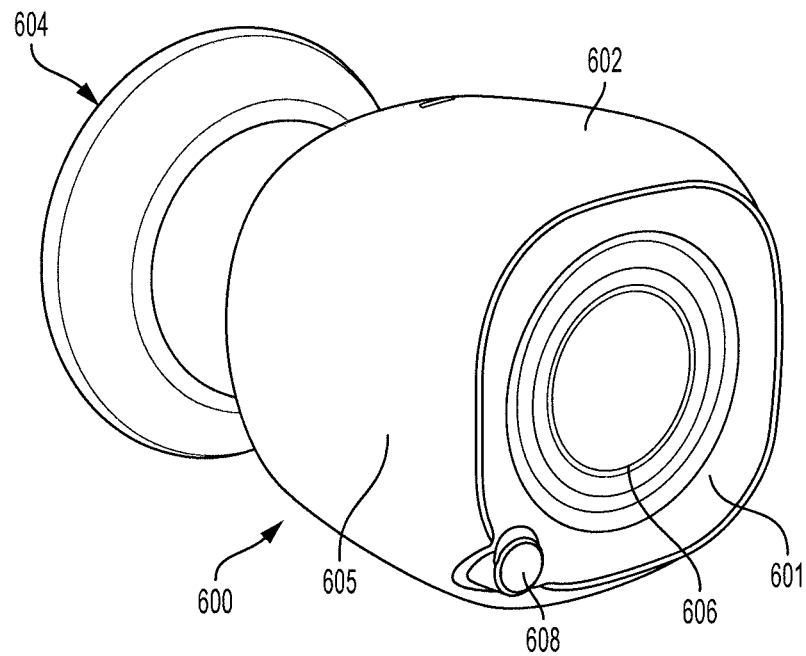
FIGS. 6A and 6B are drawings illustrating an exemplary design of a camera for use with a monitoring system according to an embodiment of the present disclosure.
Figure 6B:
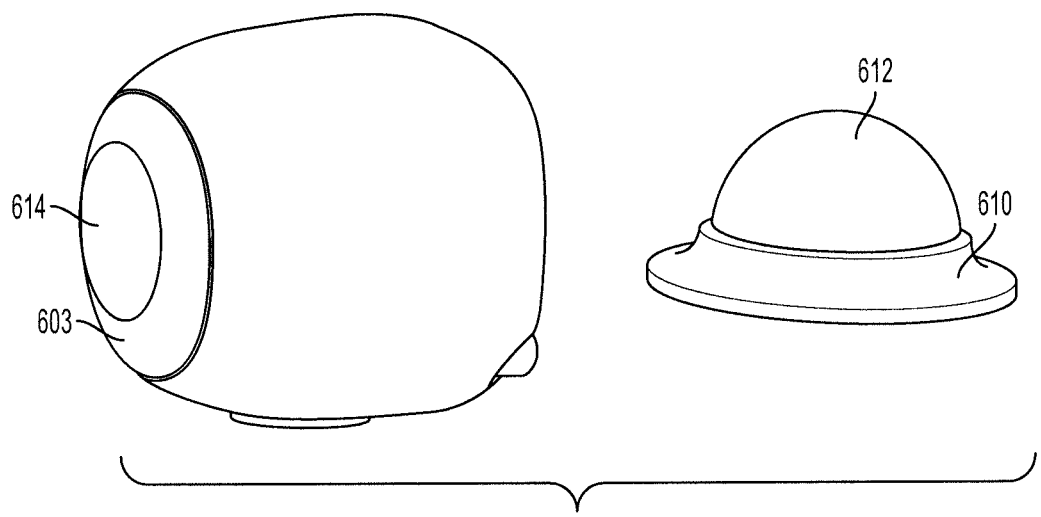

Referring now to FIGS. 6A and 6B, another exemplary camera 600 is shown. The camera 600 includes a housing 602 and a mount 604. The housing 602 has a front surface 601, a back surface 603, and four rounded side surfaces 605. In that regard, the housing 602 has a generally rounded cubic shape. The camera 600 includes an image sensor 606 and a night vision sensor 608 both located on the front surface 601.

The mount 604 includes a mounting portion 610 for being coupled to a wall or other structure and a magnetic fitting 612. The housing 602 includes a magnetic socket 614 located on the back surface 603. The magnetic fitting 612 and the magnetic socket 614 operate in a similar manner as the magnetic fitting 512 and the magnetic socket 514 of the camera 500 of FIGS. 5A and 5B.

Figure 7:
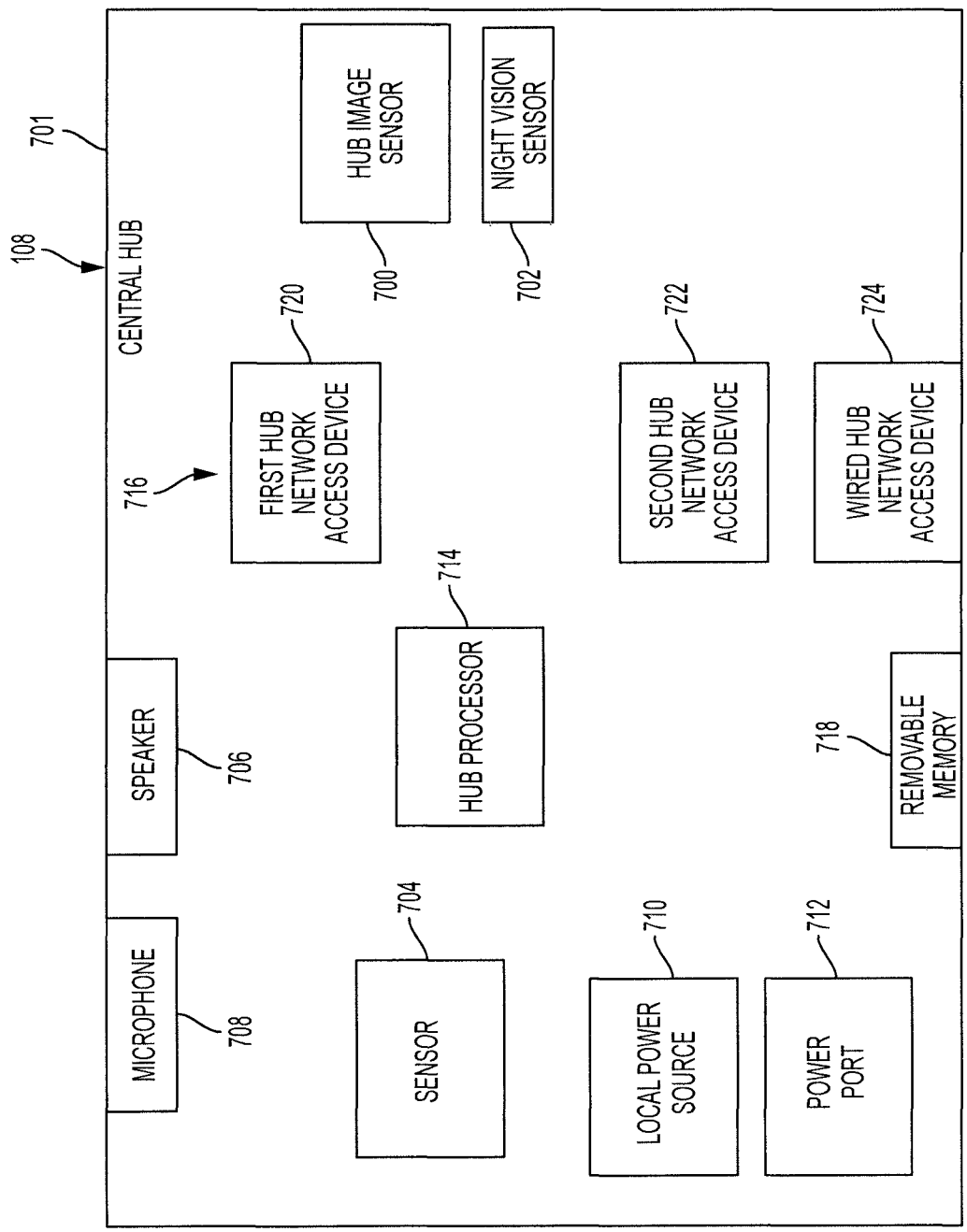
FIG. 7 is a block diagram illustrating various features of a central hub of the monitoring system of FIG. 1 according to an embodiment of the present disclosure.

Turning now to FIG. 7, various features of the central hub 108 are shown. The central hub 108 includes a housing 701. Various components of the central hub 108 are positioned in or on the housing 701.

The central hub 108 may further include one or more of a hub image sensor 700, a night vision sensor 702, a sensor 704, a speaker 706, a microphone 708, a local power source 710, a power port 712, and a removable memory port 718. These components may function in a similar manner as the corresponding components of the camera 104 of FIG. 3. Inclusion of any of these components in the central hub 108 may be optional. By including some or all of these components, the hub 108 may function in a similar manner as one or more of the cameras 102 of FIG. 1. In that regard, an individual purchasing a monitoring system may use the hub 108 as a camera and, thus, purchase one less camera than if the hub failed to include such features.

The central hub 108 may further include a hub processor 714. The hub processor 714 may perform similar functions as the camera processor 314. The hub processor 714 may also perform additional actions. For example and referring to FIGS. 1 and 7, the hub processor 714 may analyze data (image data, touch data, or any other data detected by sensors of any of the cameras 102) to determine if any predetermined conditions have been met. The hub processor 714 may further receive data from each of the cameras 102 and may transmit the data to the cloud server 110.

When analyzing the data received from one or more of the cameras 102, the central hub 108 may first determine whether any non-image data satisfies one or more predetermined condition. For example, the central hub 108 may determine whether one of the cameras 102 has been touched, whether one of the cameras 102 has been moved, whether one of the cameras 102 has detected motion, or the like. In some embodiments, the central hub 108 may analyze the image data first. When analyzing the image data, the central hub 108 may determine whether the image data meets a predetermined condition. For example, the central hub 108 may analyze the image data to determine whether movement has occurred (i.e., whether there is a mismatch of between frames of video), whether image data corresponding to a person is detected, whether image data corresponds to a dangerous situation (such as a fire or earthquake) is detected, or the like.

If one or more predetermined condition has been met, the central hub 108 may transmit a warning message to the mobile device 114 via the cloud server 110 or directly via the cellular tower 116. In some embodiments, the mobile device 114 may request to view image data in response to receiving the warning message. In that regard, the central hub 108 may transmit the image data to the mobile device 114 via the cloud server 110 or via the cellular tower 116. In some embodiments, the mobile device 114 may request additional action such as the sounding of an alarm. In that regard, the central hub 108 may receive such request and may control the speaker 706 of the central hub 108 or a speaker of one or more of the cameras 102 to play an alarm.

The central hub 108 may further include at least one hub network access device 716. As shown, the central hub 108 includes a first hub network access device 720, a second hub network access device 722, and a wired hub network access device 724.

The first hub network access device 720 may be a wireless network access device capable of communicating via a wireless protocol. For example, the first hub network access device 720 may be capable of communicating with one or more of the cloud 112 or the cameras 102 via Wi-Fi, Bluetooth, or the like.

The second hub network access device 722 may also be a wireless network access device capable of communicating via another wireless protocol. The second hub network access device 722 may transmit data via a different wireless protocol than that of the first hub network access device 720. For example, the second hub network access device 722 may communicate with one or more of the cloud 112 or the cameras 102 via a cellular protocol.

The wired hub network access device 724 may be capable of communicating via a wired protocol such as Ethernet. In that regard, the wired hub network access device 724 may communicate with one or more of the cloud 112 or the cameras 102 via a wired protocol.

Figure 8B:
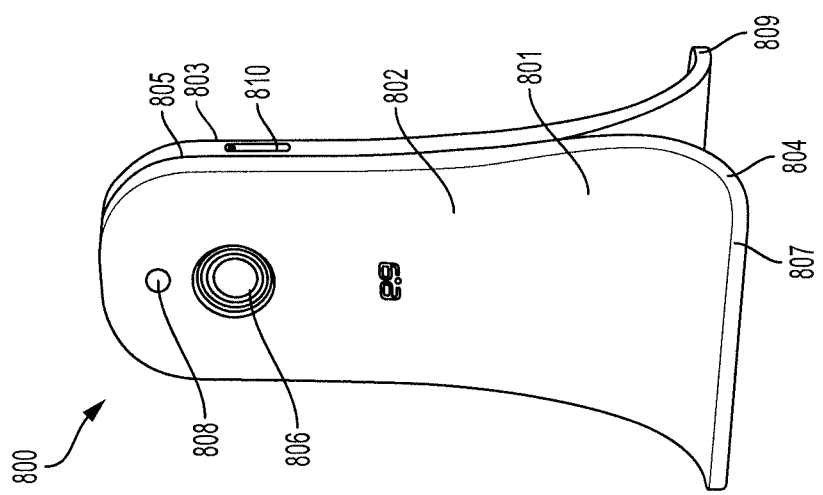
FIGS. 8A and 8B are drawings illustrating an exemplary design of a central hub for use with a monitoring system according to an embodiment of the present disclosure.
Figure 8A:
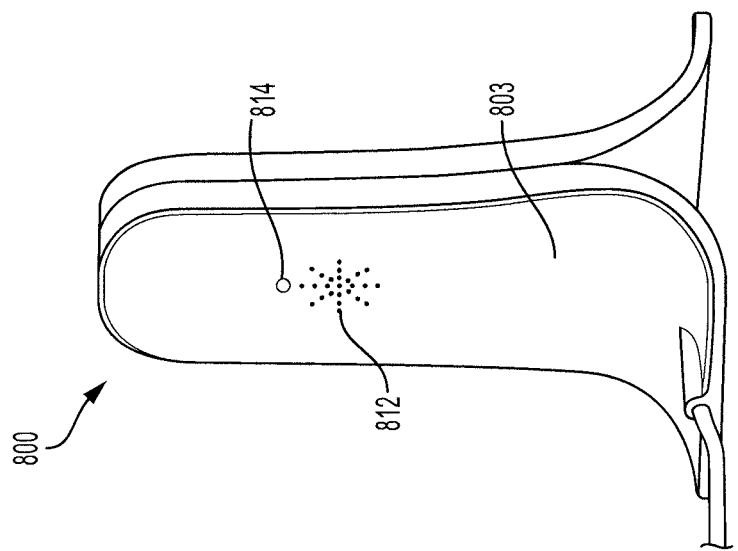

Turning to FIGS. 8A and 8B, an exemplary central hub 800 is shown. The central hub 800 includes a housing 802. The housing 802 resembles a rectangular prism having a front surface 801, a back surface 803, three side surfaces 805, and a base portion 804. The base portion 804 includes two elongated legs 807, 809. The first elongated leg 807 extends outward from the front surface 801 and the second elongated leg 809 extends outward from the back surface 803.

The central hub 800 further includes an image sensor 806 and a night vision sensor 808 positioned on the front surface 801. The central hub 800 also includes a removable memory port 810 capable of receiving a removable storage device. The removable memory port 810 may be positioned on one of the sides 805 of the housing 802. The central hub 800 further includes a speaker 812 and a microphone 814 positioned on the back surface 803.

Turning to FIGS. 9A and 9B, another exemplary central hub 900 is shown. The central hub 900 includes a housing 902 having a top surface 901, a bottom surface 903, and a generally cylindrical surface 905 extending from the top surface 901 to the bottom surface 903. In that regard, the central hub 900 has a generally cylindrical shape. The central hub 900 may rest on the bottom surface 903.

The central hub 900 further includes an image sensor 906 and a night vision sensor 908 positioned on the cylindrical surface 905. The central hub 900 also includes a speaker 912 positioned on the top surface 901. The central hub 900 further includes a power port 916 positioned on the cylindrical surface 905. The power port 916 may be designed to receive a plug or other connector of a cable that transfers electrical power. In that regard, the central hub 900 may receive power via the power port 916.

Figure 10A:
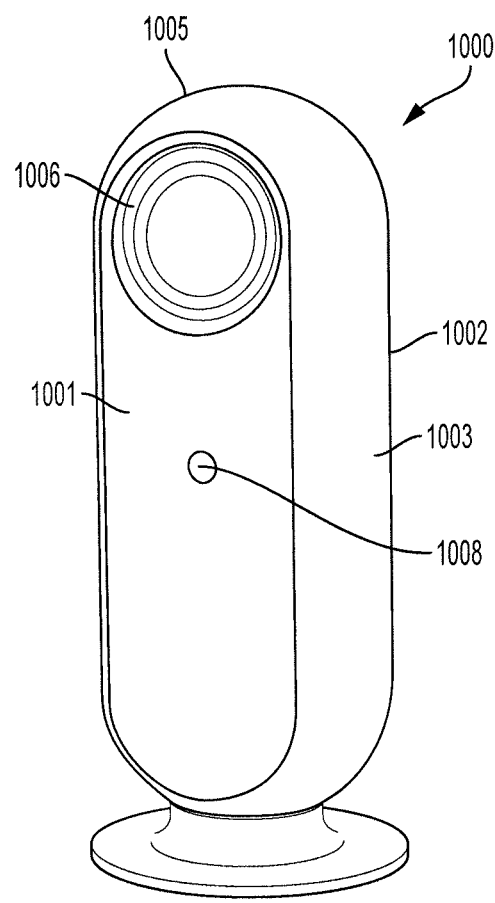
FIGS. 10A and 10B are drawings illustrating an exemplary design of a central hub for use with a monitoring system according to an embodiment of the present disclosure.
Figure 10B:
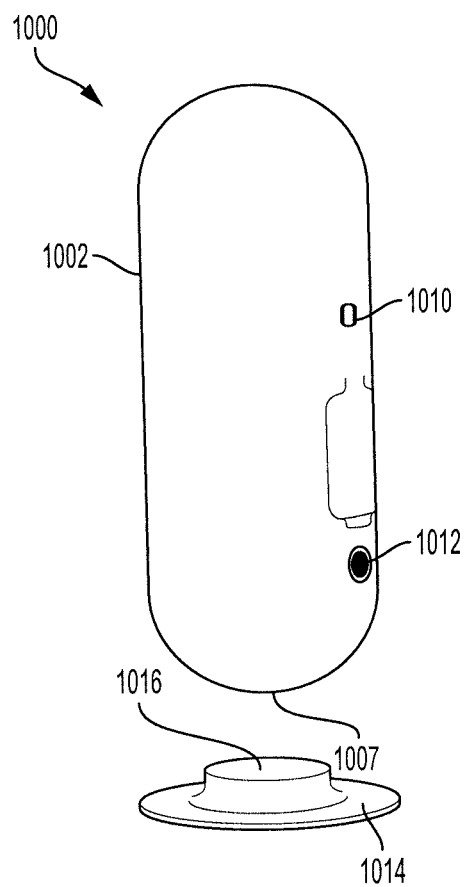

Referring to FIGS. 10A and 10B, another exemplary central hub 1000 is shown. The central hub 1000 includes a housing 1002 having a generally flat front surface 1001 and a rounded surface 1003 that resembles a rounded cylinder or capsule. The housing 1002 has a top 1005 and a bottom 1007. The bottom 1007 may have a magnetic feature designed to interface with a magnetic socket 1016 of a base 1014.

The central hub 1000 further includes an image sensor 906 and a night vision sensor 908 positioned on the front surface 1001. The central hub 1000 also includes a motion sensor 1010 and a power port 1012 positioned on the rounded surface 1003.

Figure 11:
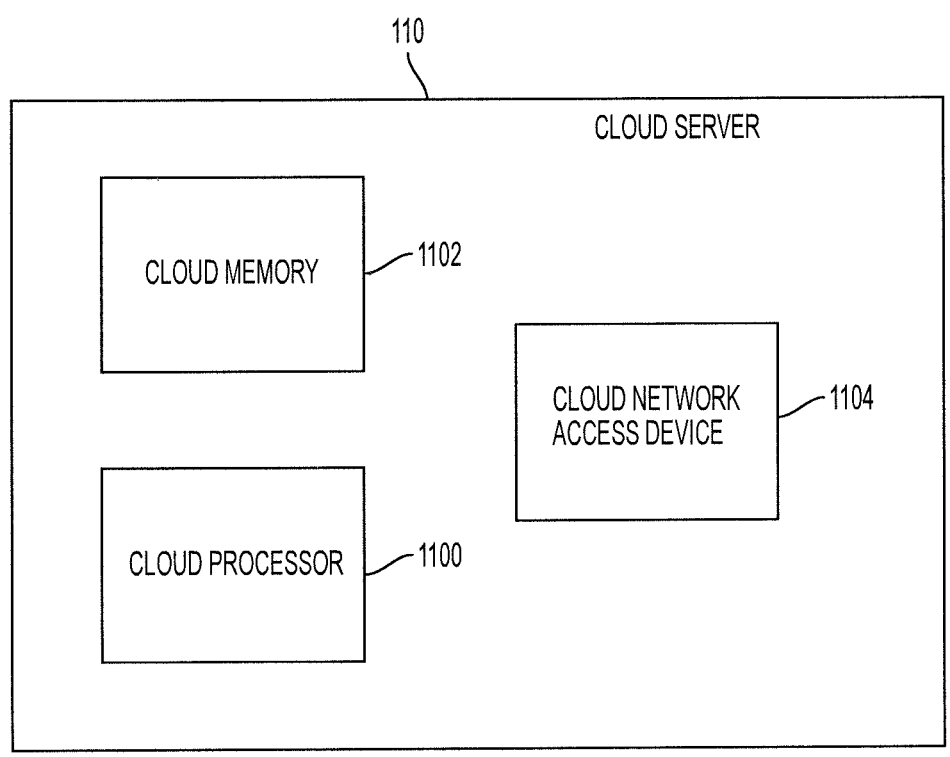
FIG. 11 is a block diagram illustrating various features of a cloud server of the monitoring system of FIG. 1 according to an embodiment of the present disclosure.

Turning to FIG. 11, various features of the cloud server 110 are shown. In particular, the cloud server 110 may include a cloud processor 1100, a cloud memory 1102, and a cloud network access device 1104. Components of the cloud server 110 may be positioned on one or more physical devices. For example, the cloud processor 1100 and the cloud network access device 1104 may be positioned on a processing server and the cloud memory 1102 may be positioned on a database server that is connected to the processing server.

The cloud network access device 1104 may include any network access device capable of communicating with the cloud 112. For example, the cloud network access device 1104 may be capable of communicating via Wi-Fi, Ethernet, a fiber optic channel, or the like.

The cloud processor 1100 may be capable of performing similar features as the hub processor 714 of the central hub 108 of FIG. 7. In particular and referring to FIGS. 1 and 11, the cloud processor 1100 may receive the image and/or other data from the central hub 108 via the cloud network access device 1104. The cloud processor 1100 may analyze the image data and/or other data to determine if a predetermined condition has been met. If a predetermined condition has been met than the cloud processor 1100 may transmit at least one of the image data or a warning to the mobile device 114. The cloud processor 1100 may further transmit a request for one or more of the central hub 108 or the cameras 102 to sound an alarm in response to a predetermined condition being met or in response to a request from the mobile device 114. The cloud processor 1100 may further transmit the image data to the mobile device 114 upon request. In some embodiments, such analysis of data may be performed by one or both of the cloud processor 1100 or the hub processor 714 of the central hub 108 of FIG. 7.

The cloud processor 1100 may further cause some or all of the image data to be stored in the cloud memory 1102. In some embodiments, the cloud processor 1100 may be designed to store a predetermined amount of image data, such as 24 hours, 36 hours, or the like. In some embodiments, the cloud processor may be designed to store samples of the image data such as one sample per second, 2 samples per second, or the like. In some embodiments, the amount of image data to be stored may be selected by a user via the mobile device 114. In some embodiments, the cloud processor 1100 may be designed to transmit stored image data to the mobile device 114 based on a request from the mobile device 114.

Figure 12:
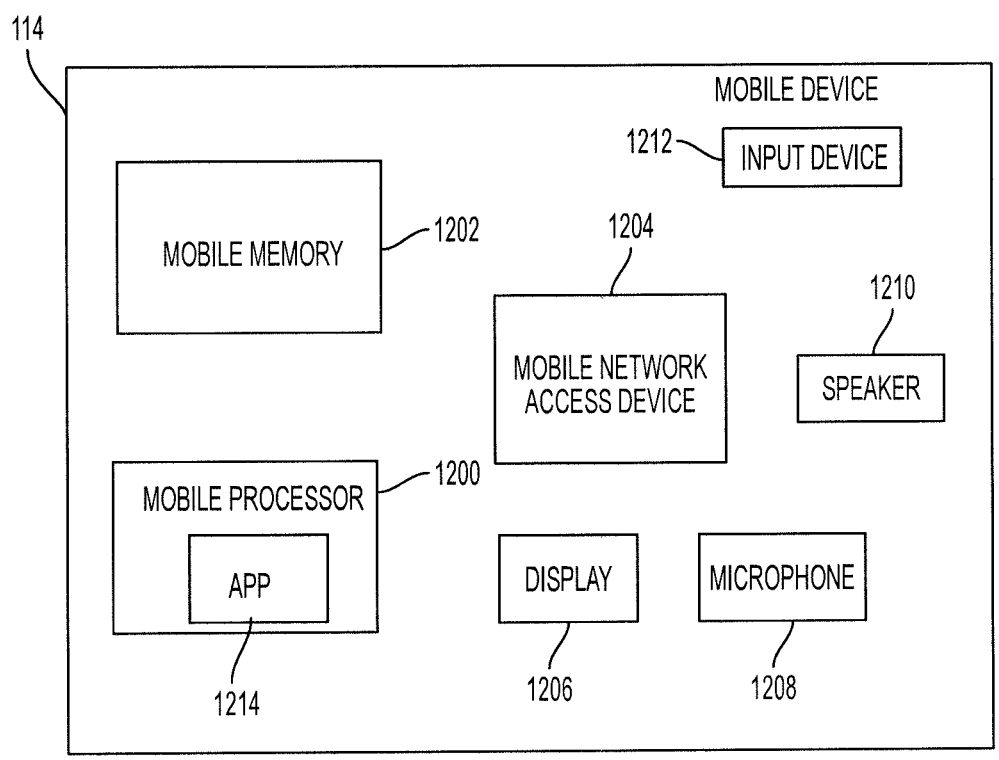
FIG. 12 is a block diagram illustrating various features of a mobile device of the monitoring system of FIG. 1 according to an embodiment of the present disclosure.

Referring to FIG. 12, various features of the mobile device 114 are shown. In particular, the mobile device 114 may have a mobile processor 1200, a mobile memory 1202, a mobile network access device 1204, a display 1206, a microphone 1208, a speaker 1210, and an input device 1212.

The mobile network access device 1204 may include one or more network access device. For example and referring to FIGS. 1 and 12, the mobile network access device 1204 may be capable of communicating with the cloud 112 via Wi-Fi and capable of communicating with the cellular tower 116 via a cellular protocol.

The mobile processor 1200 may be capable of receiving requests via the input device 1212 and transmitting the requests to the cloud server 110 and/or the central hub 108 via the mobile network access device 1204. Likewise, the mobile processor 1200 may receive data, such as image data or audio data, and control the display 1206 or the speaker 1210 to output the data. The mobile processor 1200 may further receive audio data from the microphone 1208 and transmit the audio data to the central hub 108 to be output by the central hub 108 or the cameras 102.

In some embodiments, the mobile processor 1200 may be capable of running an application (app) 1214. A user may interface with a monitoring system (such as the monitoring system 100) via the app 1214. For example, the user may receive alerts via the app 1214, may view image data from one or more camera of a monitoring system via the app 1214, or may transmit audio data to one or more camera of a monitoring system via the app 1214. In some embodiments, the user may also or instead be capable of communicating with the monitoring system via a web interface.

The mobile memory 1202 may be capable of storing instructions to be performed by the mobile processor 1200. The mobile memory 1202 may further store image data received from the cloud server 110 or the central hub 108.

Figure 13:
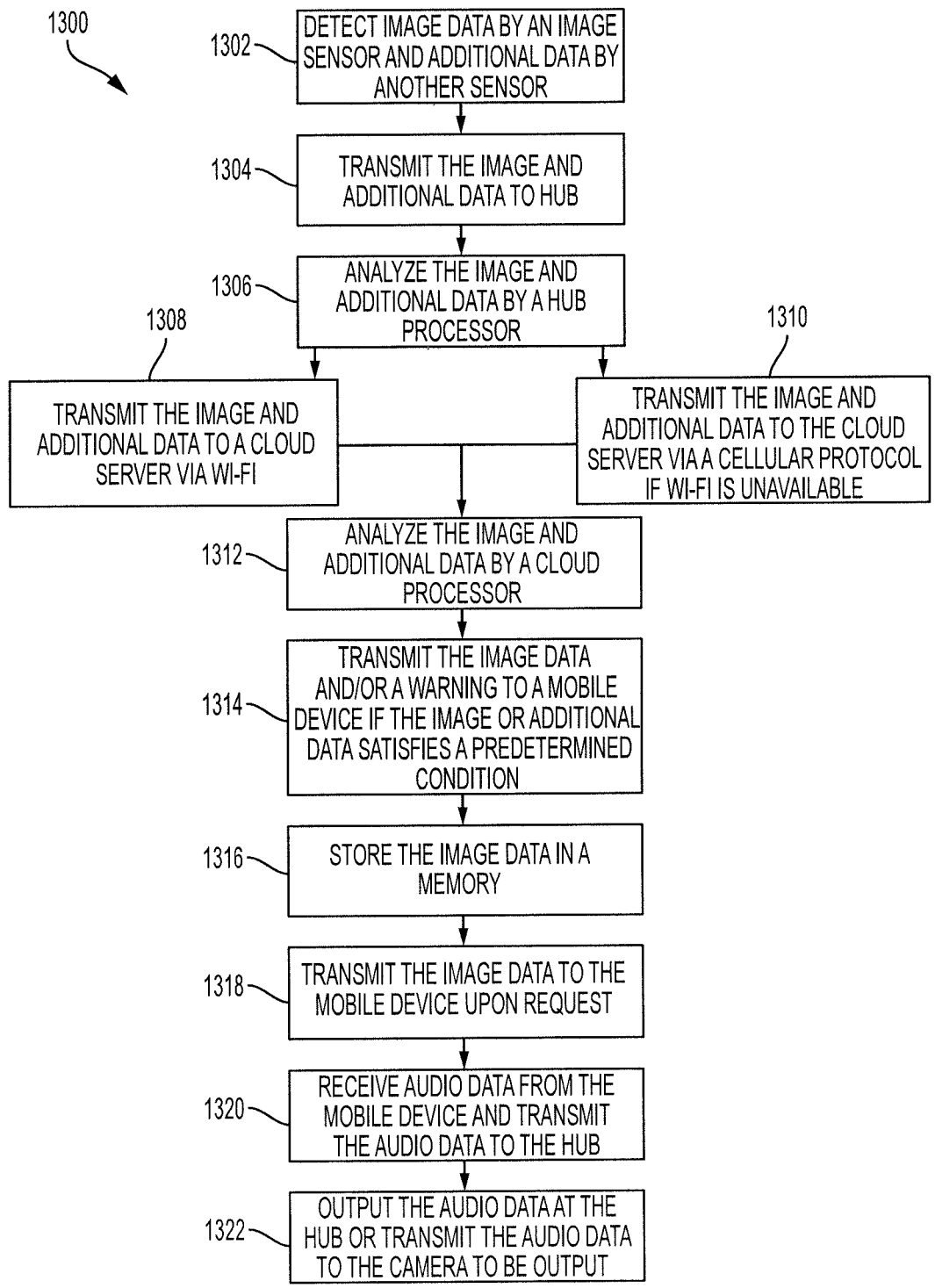
FIG. 13 is a flowchart illustrating a method for monitoring a location by a monitoring system such as the monitoring system of FIG. 1 according to an embodiment of the present disclosure.

Turning to FIG. 13, a method 1300 of monitoring an area using a monitoring system, such as the system 100 of FIG. 1, is shown. In block 1302, an image sensor of one or more camera or central hub may detect image data. Similarly, additional data may be detected by another sensor of one or more camera or the central hub.

In block 1304, the image and additional data may be transmitted to a central hub. For example, the data may be transmitted via Wi-Fi, Bluetooth, a cellular protocol, or the like.

In block 1306, a hub processor of the central hub may analyze the image data and the additional data. For example, the hub processor may analyze the data to determine if one or more predetermined condition is met.

In block 1308, the central hub may attempt to transmit the image data and the additional data to a cloud server. For example, the central hub may attempt to transmit the data via Wi-Fi. In some embodiments, the central hub may transmit the analysis of the data to the cloud server. In some embodiments, the central hub may not analyze the data and may transmit the data to the cloud server without analysis.

In some embodiments, Wi-Fi may be unavailable. For example, a Wi-Fi router may be powered down or Internet connection may not be available from the location. In that regard, in block 1310, the central hub may transmit the data to the cloud server via a cellular protocol. In some embodiments, the central hub may transmit the data directly to a mobile device via a cellular tower.

In block 1312, the image data and the additional data may be analyzed by a cloud processor of the cloud server. In some embodiments, the analysis may be performed by the central hub. In that regard, the cloud processor may or may not analyze the data.

In block 1314 if a predetermined condition has been met, the cloud server 110 may transmit one or more of the image data or a warning indicating the predetermined condition to the mobile device. For example, the cloud server may transmit a message such as "motion has been detected within your kitchen" or "the camera in your living room has been moved." As another example, the cloud server may transmit image data from a camera positioned in a kitchen if motion has been detected inside of the kitchen.

In block 1316, the cloud server may store the image data in a memory. In some embodiments, the cloud server may store all received image data in the memory for a predetermined amount of time and, in some embodiments, the cloud server may only store data in the memory upon request. In some embodiments, the cloud server may store periodic frames of the image data in the memory.

Occasionally, a user may request to receive the image data via a mobile device. In that regard and in block 1318, one or both of the cloud server or the central hub may be designed to transmit the image data to the mobile device upon request.

In block 1320, the cloud server or the central hub may receive audio data from the mobile device that is intended to be output by the central hub or one of the cameras. In that regard, the cloud server or the central hub may transmit the audio data to the corresponding unit for output.

In block 1322, the audio data may be output by the central hub or the corresponding camera. In some embodiments, the user may request two-way audio. In that regard, the central hub or a camera may receive audio data and transmit the audio data to the mobile device via the cloud server 110 or the cellular tower 116.

Figure 14:
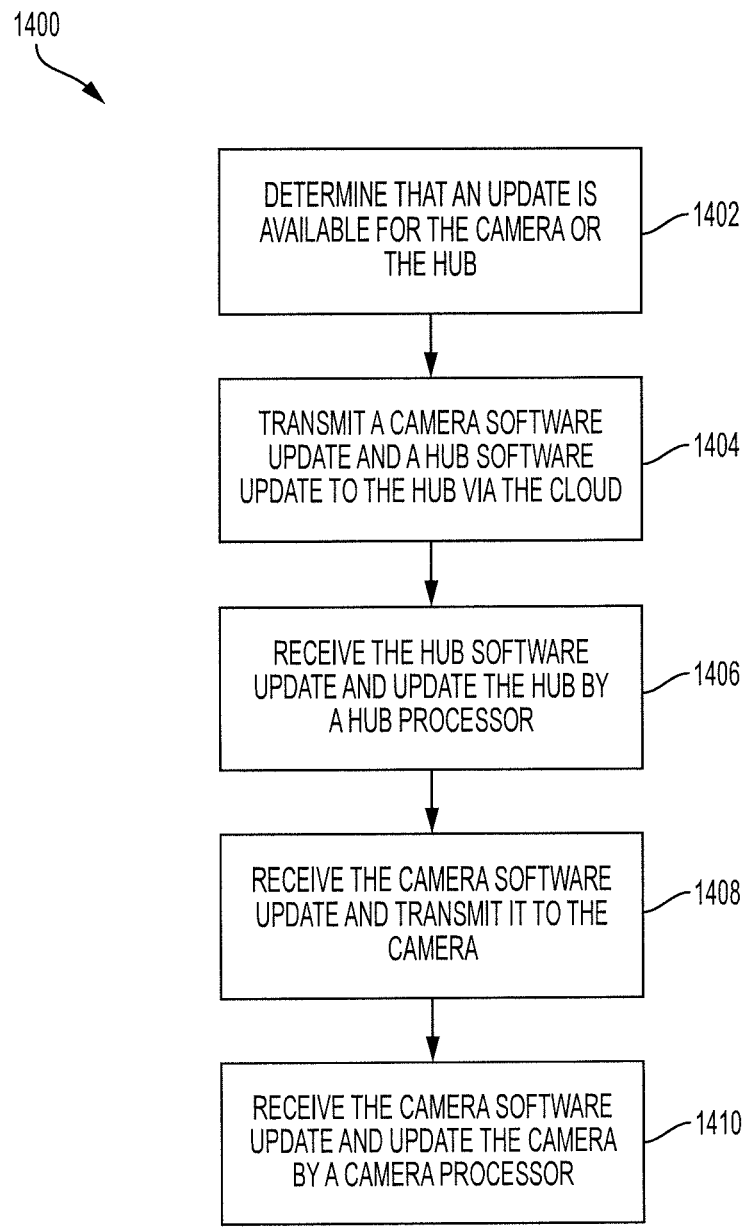
FIG. 14 is a flowchart illustrating a method for updating components of a monitoring system such as the monitoring system of FIG. 1 according to an embodiment of the present disclosure.

In some embodiments, software updates may be provided for various components of a monitoring system. In that regard, a central hub may be capable of receiving the software updates and updating the corresponding component. Referring to FIG. 14, a method 1400 for such updates is shown.

In block 1402, the central hub may determine that an update is available for itself or for one or more camera. For example, the central hub may receive a notification from the cloud indicating that the update is available.

In block 1404, the software update may be transmitted to the central hub. For example, the software update may be received from a cloud server.

In block 1406, the central hub may receive the hub software update. Upon receiving the hub software update, the hub processor of the central hub may cause the software update to be installed.

In block 1408, the central hub may receive the camera software update. Upon receiving the camera software update, the central hub may transmit the camera software update to the one or more corresponding camera.

In block 1410, the one or more camera may receive the camera software update. Upon receiving the camera software update, the corresponding camera processor may cause the update to be installed. In some embodiments, the hub processor may control installation of the camera software update instead of the camera processor.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A monitoring system comprising:
   a first camera having:
      a housing,
      an image sensor positioned in or on the housing and configured to detect image data corresponding to an environment of the first camera,
      a camera network access device positioned in the housing and configured to wirelessly transmit the image data,
      a local power source positioned in the housing, coupled to the image sensor and the camera network access device, and configured to store electrical power to be used by the image sensor and the camera network access device,
      a sensor configured to detect whether the first camera has been moved from an original location, the sensor being at least one of a G-Force sensor configured to detect physical movement of the first camera or a touch sensor configured to detect contact with the first camera by an individual;
   a hub separate from the first camera and having a hub processor configured to analyze the image data and at least one hub network access device configured to:
      wirelessly receive the image data from the camera network access device,
      wirelessly transmit an analysis of the image data to a cloud server, and
      wirelessly transmit a warning message to a remote device via the cloud server when the sensor detects that the first camera has been moved from the original location; and
   the cloud server having:
      a cloud network access device configured to communicate with the at least one hub network access device, and
      a cloud processor coupled to the cloud network access device and configured to determine that a software update is available for the first camera and for the hub, and to control the cloud network access device to transmit a camera software update and a huh software update to the hub, wherein:
the hub processor is configured to receive the camera software update and the hub software update via the at least one hub network access device, to install the hub software update, and to control the at least one hub network access device to transmit the camera software update to the first camera, and
the first camera further includes a camera processor configured to receive the camera software update via the camera network access device and to install the camera software update.

2. The monitoring system of claim 1 wherein the first camera further includes a power port coupled to the image sensor, the camera network access device, and the local power source and configured to provide external electrical power to the image sensor, the camera network access device, and the local power source from an external power source.

3. The monitoring system of claim 2 wherein the first camera further includes a power sensor configured to detect whether the first camera has ceased receiving the external electrical power via the power port and wherein the hub is further configured to transmit a warning message to the remote device via the cloud server when the power sensor detects that the first camera has ceased receiving the external electrical power.

4. The monitoring system of claim 1 wherein the first camera further includes a night-vision sensor configured to detect night-vision image data corresponding to light having a frequency of less than 400 nanometers or greater than 700 nanometers and wherein the image data includes the night-vision image data.

5. The monitoring system of claim 1 wherein:
the first camera further includes a microphone configured to detect audio data and a speaker configured to output audio data;
the hub is configured to receive the detected audio data from the microphone and to transfer the detected audio data to the remote device via the cloud server; and
the hub is configured to receive the output audio data from the remote device via the cloud server and to transfer the output audio data to the speaker to be output.

6. The monitoring system of claim 1 further comprising a second camera having similar features as the first camera and wherein the hub is configured to receive the detected image data from the first camera and from the second camera and to transmit the detected image data from the first camera and from the second camera to the cloud server.

7. The monitoring system of claim 1 wherein the at least one huh network access device includes a first hub network access device configured to wirelessly communicate with the first camera and a second hub network access device configured to wirelessly communicate with the cloud server via a cellular protocol.

8. The monitoring system of claim 1 wherein the at least one hub network access device includes a first hub network access device configured to wirelessly communicate with the cloud network access device via an IEEE 802.11 standard and a second hub network access device configured to wirelessly communicate with the cloud network access device via a cellular protocol when the first hub network access device is unable to communicate with the cloud server.

9. The monitoring system of claim 1 wherein the hub includes a hub image sensor configured to detect additional image data and wherein the at least one hub network access device is further configured to transmit the additional image data to the cloud server.

10. The monitoring system of claim 1 wherein the cloud server further includes a cloud memory configured to store the image data, wherein:
at least one of the cloud processor or the hub processor is configured to analyze the image data to determine whether the image data satisfies a predetermined condition corresponding to a potential threat, and
the cloud processor is further configured to control the cloud network access device to transmit at least one of the image data or a message to the mobile device associated with the user when the image data satisfies the predetermined condition.

11. The monitoring system of claim 1 further comprising an inertial measurement unit (1MU) sensor configured to detect camera movement data corresponding to movement of the housing, Wherein the camera network access device is further configured to transmit the camera movement data to the hub network access device.

12. The monitoring system of claim 1 wherein the hub further includes a battery coupled to the at least one hub network access device and configured to provide electrical power to the at least one hub network access device and a power port coupled to the at least one hub network access device and the battery and configured to provide external electrical power to the hub network access device and the battery from an external power source.

13. A monitoring system comprising:
a first camera having:
a housing,
an image sensor positioned in or on the housing and configured to detect image data corresponding to an environment of the first camera,
a camera network access device positioned in the housing and configured to wirelessly transmit the image data,
a sensor configured to detect whether the first camera has been moved from an original location, the sensor being at least one of a G-Force sensor configured to detect physical movement of the first camera or a touch sensor configured to detect contact with the first camera by an individual;
a hub separate from the first camera and having:
a hub processor configured to analyze the image data,
a first hub network access device configured to wirelessly receive the image data from the camera network access device, wirelessly transmit an analysis of the image data to a cloud server, and wirelessly transmit a warning message to a remote device via the cloud server when the sensor detects that the first camera has been moved from the original location, and
a second hUb network access device configured to wirelessly transmit the analysis of the image data to the cloud server and wirelessly transmit the warning message via a cellular protocol when the first hub network access device is unable to communicate with the cloud server; and
a cloud server having:
a cloud network access device configured to communicate with at least one of the first hub network access device or the second network access device, and
a cloud processor coupled to the cloud network access device and configured to determine that a software update is available for the first camera and for the hub, and to control the cloud network access device to transmit a camera software update and a hub software update to the hub, wherein:
the hub processor is configured to receive the camera software update and the hub software update via the at least one huh network access device, to install the hub software update, and to control the at least one huh network access device to transmit the camera software update to the first camera, and
the first camera further includes a camera processor configured to receive the camera software update via the camera network access device and to install the camera software update.

14. The monitoring system of claim 13 wherein the first camera further includes:
a battery coupled to the image sensor and the camera network access device and configured to store electrical power to be used by the image sensor and the camera network access device; and
a power port coupled to the image sensor, the camera network access device, and the battery and configured to provide external electrical power to the image sensor, the camera network access device, and the battery from an external power source.

15. The monitoring system of claim 14 wherein the first camera further includes a power sensor configured to detect whether the first camera has ceased receiving the external electrical power via the power port and wherein the hub is further configured to transmit a warning message to the remote device via the cloud server when the power sensor detects that the first camera has ceased receiving the external electrical power.

16. The monitoring system of claim 13 wherein the cloud server further includes a cloud memory configured to store the image data, wherein:
at least one of the cloud processor or the hub processor is configured to analyze the image data to determine whether the image data satisfies a predetermined condition corresponding to a potential threat, and
the cloud processor is further configured to control the cloud network access device to transmit at least one of the image data or a message to the mobile device associated with the user when the image data satisfies the predetermined condition.

17. A monitoring system comprising:
a first camera having:
a housing,
an image sensor positioned in or on the housing and configured to detect image data corresponding to an environment of the first camera,
a camera network access device positioned in the housing and configured to wirelessly transmit the image data,
a sensor configured to detect whether the first camera has been moved from an original location, the sensor being at least one of a G-Force sensor configured to detect physical movement of the first camera or a touch sensor configured to detect contact with the first camera by an individual;
a hub separate from the first camera and having a hub processor configured to analyze the image data and at least one hub network access device configured to wirelessly receive the image data from the camera network access device, wirelessly transmit an analysis of the image data, and wirelessly transmit a warning message to a remote device via the cloud server when the sensor detects that the first camera has been moved from the original location; and
a cloud server having:
a cloud network access device configured to communicate with the at least one hub network access device, to receive the anal sis of the image data from the hub, and to transmit the analysis of the image data and the warning message to the remote device associated with a user, and
a cloud processor coupled to the cloud network access device and configured to determine that a software update is available for the first camera and for the hub, and to control the cloud network access device to transmit a camera software update and a hub software update to the hub,
wherein:
the hub processor configured to receive the camera software update and the hub software update via the at least one hub network access device, to install the hub software update, and to control the at least one hub network access device to transmit the camera software update to the first camera, and
the first camera further includes a camera processor configured to receive the camera software update via the camera network access device and to install the camera software update.

18. The monitoring system of claim 17 wherein the first camera further includes:
a battery coupled to the image sensor and the camera network access device and configured to store electrical power to be used by the image sensor and the camera network access device; and
a power port coupled to the image sensor, the camera network access device, and the battery and configured to provide external electrical power to the image sensor, the camera network access device, and the battery from an external power source.

19. The monitoring system of claim 17 wherein the at least one hub network access device includes a first hub network access device configured to wirelessly communicate with the cloud network access device via an IEEE 802.11 standard and a second hub network access device configured to wirelessly communicate with the cloud network access device via a cellular protocol when the first hub network access device is unable to communicate with the cloud server.

* * * * *